H. P. Jordan,
Wheel Cultivator.

No. 110,853. Patented Jan. 10, 1871.

Witnesses:

Inventor:
H. P. Jordan
per Munn & Co.
attorneys

UNITED STATES PATENT OFFICE.

HUGH P. JORDAN, OF VICTORIA, TEXAS.

IMPROVEMENT IN SULKY-CULTIVATORS.

Specification forming part of Letters Patent No. 110,853, dated January 10, 1871.

*To all whom it may concern:*

Be it known that I, HUGH P. JORDAN, of Victoria, in the county of Victoria and State of Texas, have invented a new and useful Improvement in Sulky-Cultivator; and I do hereby declare that the following is a full, clear, and exact description thereof, which will enable others skilled in the art to make and use the same, reference being had to the accompanying drawing, forming part of this specification.

Figure 1:
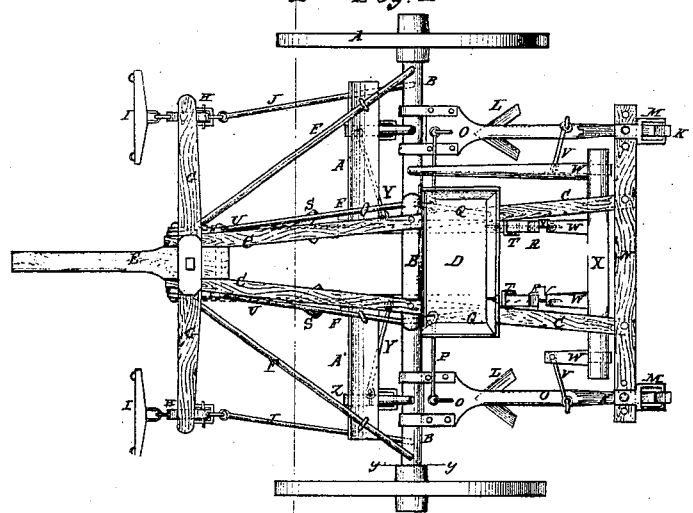
Figure 2:
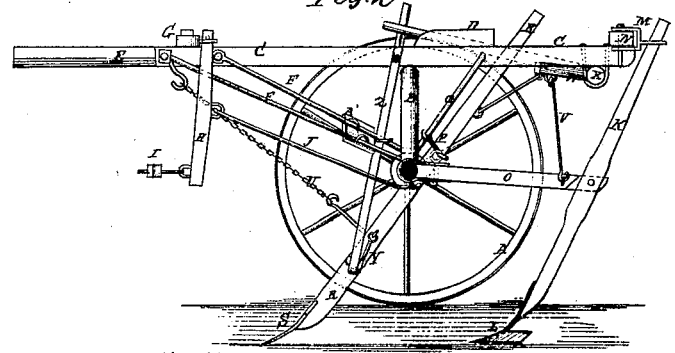
Figure 3:
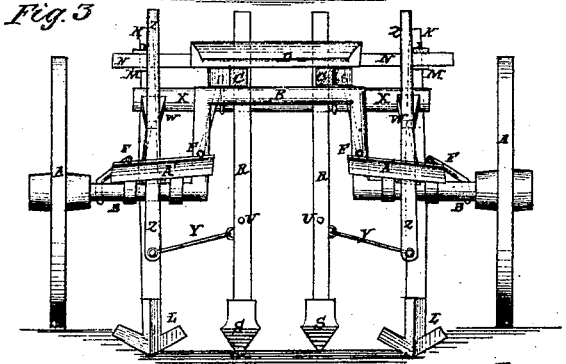

Figure 1 is a top view of my improved cultivator. Fig. 2 is a side view of the same, partly in section through the line $y\,y$, Fig. 1. Fig. 3 is a vertical cross-section of the same, taken through the line $x\,x$, Fig. 1.

Similar letters of reference indicate corresponding parts.

My invention has for its object to furnish an improved sulky-cultivator which shall be simple in construction, easily operated, and effective in operation, giving the operator full control over the inner or forward plows, enabling crooked rows to be conveniently cultivated and grass and weeds to be cut up close to the plants, or even between the hills of the row being cultivated; and it consists in the construction and combination of the various parts of the cultivator, as hereinafter more fully described.

A are the sulky-wheels, which revolve upon and are secured to the axle-tree B in the ordinary manner. The middle part of the axle-tree B is bent four times at right angles to form a space or offset, to allow the cultivator to be used for cultivating tall plants without breaking or injuring the said plants. To the upper part or bend of the axle-tree B are attached the middle parts of the two bars C, to which, a little in the rear of the axle-tree B, is attached the driver's seat D, and to and between the forward ends of which is rigidly attached the rear end of the tongue E. The forward ends of the bars C are sustained against the draft-strain and against the lateral strain in turning by the four brace-rods F, two upon each side, the forward ends of which are attached to the forward ends of the said bars C and the rear ends of which are attached to the lower horizontal parts of the axle-tree B, near the ends of said parts. G is the double-tree, which is pivoted to the rear part of the tongue E. H are the draft-bars, the upper ends of which pass up through staples or keepers attached to the rear sides of the ends of the double-tree G, and to the lower end of which are attached the whiffletrees I. To the middle parts of the draft-bars H are attached the forward ends of the draft-rods J, the rear ends of which are attached to the lower horizontal parts of the axle-tree B, near the outer ends of said parts.

By this construction the points of draft attachment may be conveniently raised and lowered as required, enabling the line of draft to be so regulated as to relieve the necks of the horses from any downward pressure from the tongue.

K are the rear plow-standards, to the lower ends of which are attached the plows L and the upper ends of which pass up through keepers M, adjustably attached to the end parts of the cross-bar N, attached to the rear ends of the bars C, so that, by adjusting the said keepers, the plow-standards K may be adjusted nearer together or farther apart, as the circumstances of the case may require.

The draft-strain upon the standards K is sustained by the draft-bars O, the rear ends of which are pivoted to the middle parts of the said standards, and the forward ends of which are connected with and pivoted to the lower horizontal parts of the axle-tree B, as shown in Figs. 1, 2, and 3, by straps passing around said axle-tree and attached to said bars.

The forward ends of the draft-bars O are held in proper position upon the axle-tree B by the rods P, the outer ends of which are connected with the forward ends of the said bars O and the inner ends of which are connected with the rods Q, that brace the rear parts of the bars G.

R are the forward or inner plow-standards, to the lower ends of which the plows S are attached, and the upper ends of which pass up through guide-staples or keepers T, attached to the inner sides of the rear parts of the bars C.

The draft-strain upon the plow-standards R is sustained by the chains or rods U, the rear ends of which are attached to the lower parts of said standards and the forward ends of which are attached to the forward ends of the bars C.

V are four rods, the lower ends of which are connected with the plow-standards K R, and the upper ends of which are attached to four short levers, W, the rear ends of which are attached to the shaft or roller X, which works in staples or other bearings attached to the rear ends of the bars C. One or both the side levers W may be extended forward at the side or sides of the seat D, so that it or they may be conveniently reached and operated by the driver to raise all the plows from the ground at the same time.

To the outer sides of the lower part of the forward or inner standard R are pivoted the inner ends of the rods Y, the outer ends of which are pivoted to the lower ends of the levers Z, which pass down through staples or keepers attached to the rear edge of the cross-bars A', which are secured to and supported by the brace-rods F.

The levers Z are provided with pins or other stops, which, by striking against the said keepers or bars, will prevent the levers Z from dropping down too far, and will pivot the said levers to the said cross-bar. By this arrangement the driver, by moving the upper ends of the levers Z laterally, can guide the forward or inner plows as may be required, to plow crooked rows, to plow close up to the plants, or even to plow up grass between the hills of the row being cultivated. This construction also enables the upper ends of the levers Z to be moved toward the front and rear of the machine without moving the forward plows, thus enabling the driver to guide his team while holding one of the said levers Y in each hand.

Having thus described my invention, I claim as new and desire to secure by Letters Patent—

1. The frame-work of the cultivator, consisting of the bent axle-tree B, bars C, rear cross-bar N, tongue E, and brace-rods F Q, said parts being constructed and arranged substantially as herein shown and described, and for the purpose set forth.

2. The plow-standards K, draft-bars O, plow-standards R, and draft rods or chains U, constructed and arranged, in connection with the bars N C and axle-tree B, substantially as herein shown and described, and for the purpose set forth.

3. The combination of the shaft or roller X, levers W, and connecting-rods V with the plow-standards K R and bars C of the frame-work of the cultivator, substantially as herein shown and described, and for the purpose set forth.

4. The combination of the levers Z and connecting-rods Y with the plow-standards R, and with the cross-bars A' attached to the braces F of the frame-work of the cultivator, substantially as herein shown and described, and for the purpose set forth.

HUGH P. JORDAN.

Witnesses:
LEANDER WALKER,
WILLIAM L. SHARKEY.